Figure 1:
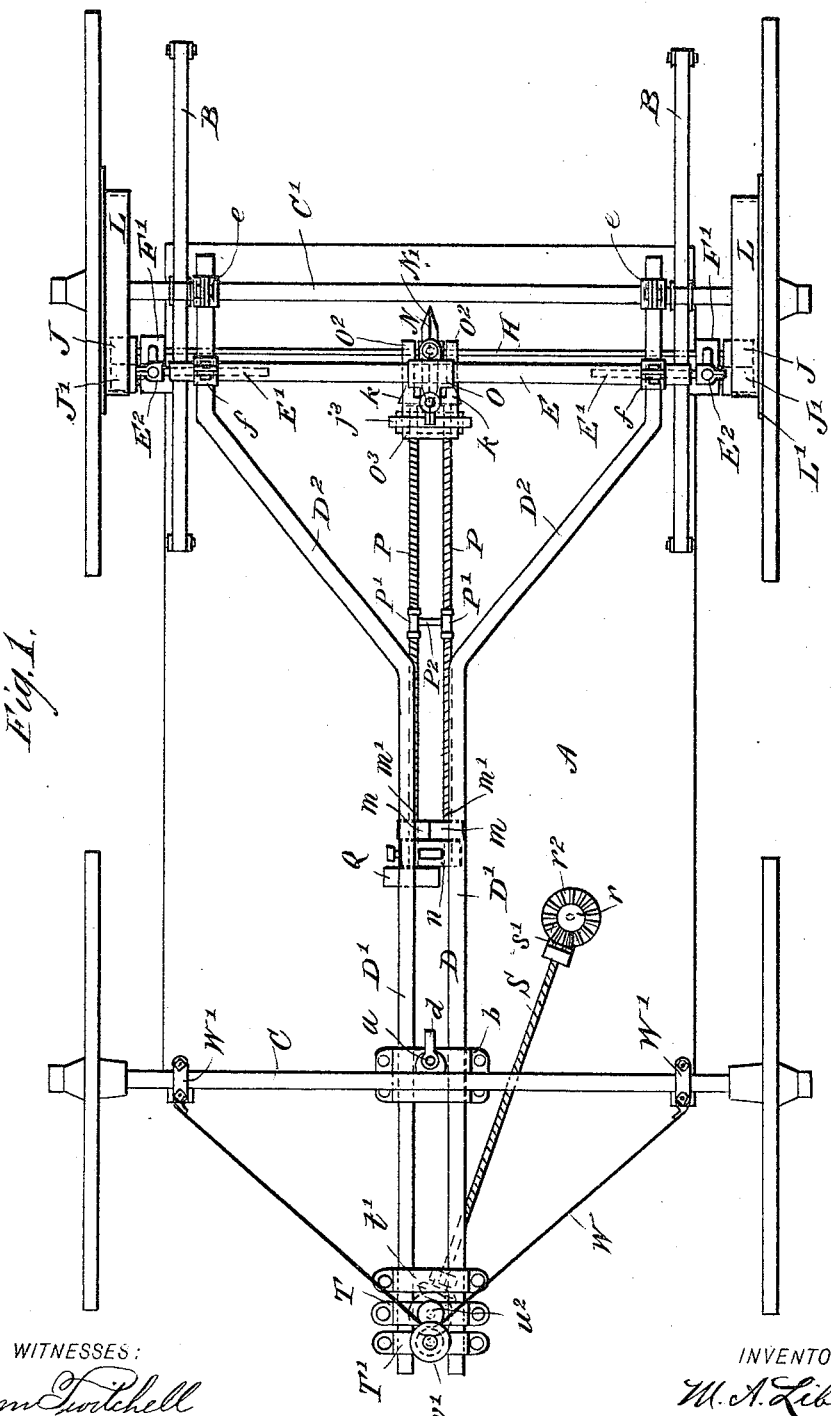

(No Model.) 3 Sheets—Sheet 1.

M. A. LIBBEY.
PROPELLING MECHANISM FOR VEHICLES.

No. 438,010. Patented Oct. 7, 1890.

WITNESSES:
Donn Twitchell
C. Sedgwick

INVENTOR:
M. A. Libbey
BY
Munn & Co.
ATTORNEYS

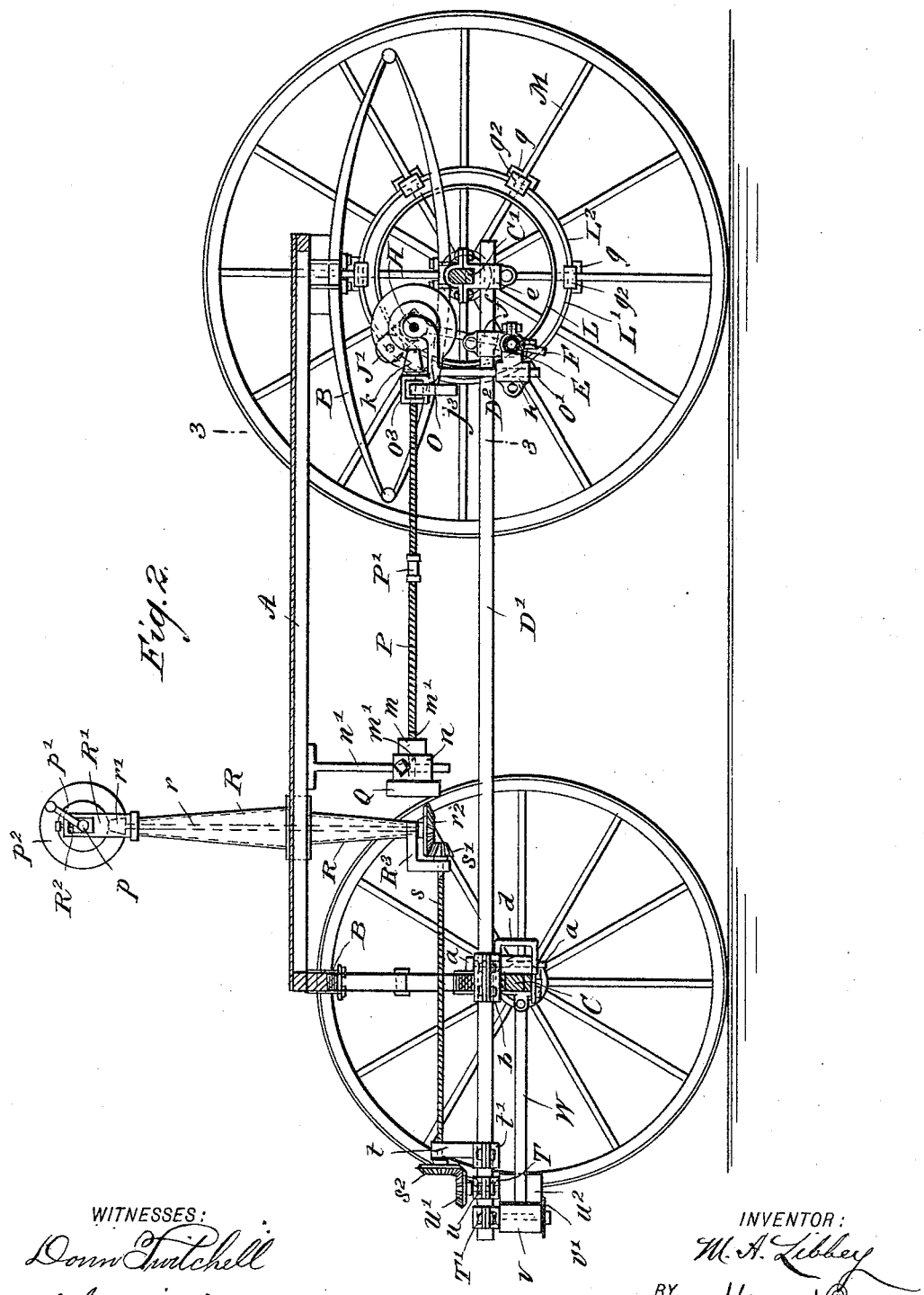

(No Model.) 3 Sheets—Sheet 3.
M. A. LIBBEY.
PROPELLING MECHANISM FOR VEHICLES.
No. 438,010. Patented Oct. 7, 1890.
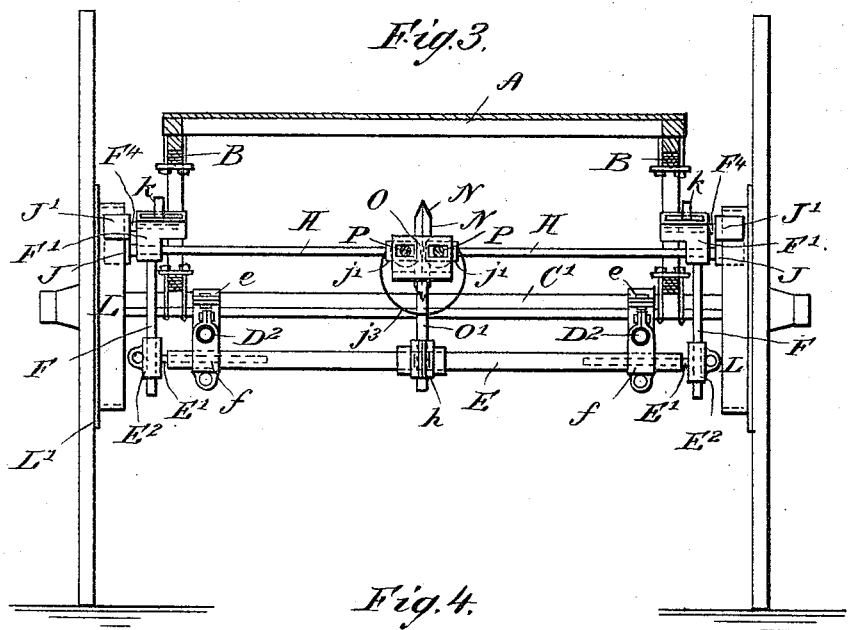
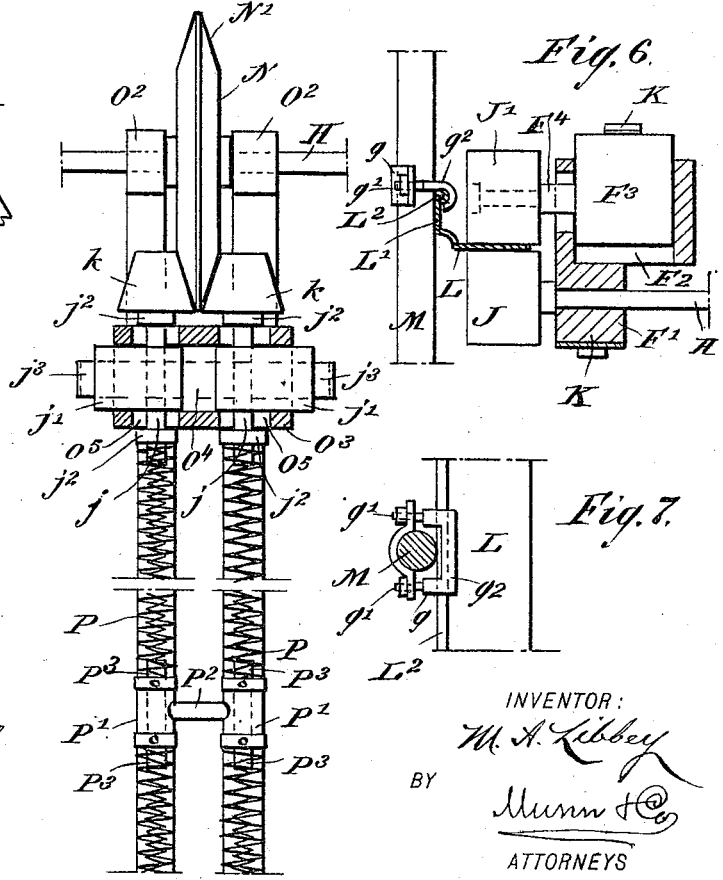
WITNESSES:
Donn Twitchell
C. Sedgwick
INVENTOR:
M. A. Libbey
BY
Munn & Co.
ATTORNEYS

UNITED STATES PATENT OFFICE.

MARK A. LIBBEY, OF SOUTH BERWICK, MAINE.

PROPELLING MECHANISM FOR VEHICLES.

SPECIFICATION forming part of Letters Patent No. 438,010, dated October 7, 1890.

Application filed March 26, 1890. Serial No. 345,308. (No model.)

*To all whom it may concern:*

Be it known that I, MARK A. LIBBEY, of South Berwick, in the county of York and State of Maine, have invented a new and useful Propelling Mechanism for Vehicles, of which the following is a full, clear, and exact description.

My invention relates to improvements in propelling mechanism for vehicles, and is especially adapted to road-vehicles, although it may be used upon any kind of a vehicle, if desired.

The propelling mechanism heretofore usually applied to vehicles has been heavy and cumbersome, and has not been suited to the movement of the carriage-springs and the varying movements of the carriage as it travels over uneven roads.

The object of my invention is to obviate this difficulty by providing a light and simple, but strong and durable, propelling mechanism that may be applied to any style of vehicle, that may be easily adjusted, and that will adapt itself to all possible movements of the vehicle to which it is attached.

To this end my invention consists in a vehicle mechanism constructed substantially as hereinafter described and claimed.

Reference is to be had to the accompanying drawings, forming a part of this specification, in which similar letters of reference indicate corresponding parts in all the figures.

Figure 1 is an inverted plan of a vehicle provided with propelling mechanism embodying my invention; Fig. 2, a vertical longitudinal section of the same; Fig. 3, a vertical cross-section of the same on the line 3 3 of Fig. 2; Fig. 4, an enlarged detail plan view of the main friction disk and rollers and of the spiral driving-shafts; Fig. 5, an enlarged detail view showing the manner in which the friction-rollers are applied to the main driving drum or flange; Fig. 6, a cross-section on the line 6 6 of Fig. 5, and Fig. 7 a section on the line 7 7 of Fig. 5.

In the accompanying drawings I have shown the device applied to an ordinary four-wheeled vehicle having a body A, supported by suitable springs B, which rest upon the axles C and C', the axles being connected with the wheels in the usual manner. The forward axle C and rear axle C' are connected by a light frame D, consisting of two parallel members D', which at their rear ends terminate in the spreading branches $D^2$.

The frame D is long enough to enable it to be attached to various sizes of vehicles and to extend in front of the forward axle C to support a portion of the steering apparatus, as described below.

The frame D is pivotally attached to the forward axle C by a king-bolt $a$, which projects through the plate $b$, which is adjustably attached to the frame D, and through the yoke $d$, which is attached to the center of the axle C. The plate $b$ is longitudinally adjustable on the frame D, and the forward spring B of the vehicle is attached thereto, so that the king-bolt $a$ will form the axis of oscillation for the vehicle-body and for the frame D.

The branches $D^2$ of the frame D extend below the rear axle C', near each end thereof, and are attached thereto by clips $e$, which inclose the branches and are suitably clamped to the axle. The frame D may be adjusted to the width of the carriage to which it is attached by placing the members D' nearer together or farther apart, as the case may be.

I do not confine myself to the particular form or arrangement of the frame D, as any suitable frame may be used which will adjustably connect the forward and rear axles and which will properly support the parts, as described below.

Depending from each of the branches $D^2$ a little in front of the axle C' is a clip or clamp $f$. These clamps are suitably attached to the branches and support the hollow shaft E, which extends through the clamps and in each end of which projects a rod or shaft E' to facilitate the lateral adjustment to the vehicle, said rods having the clamps $E^2$ affixed to their outer ends.

Supported in the clamps $E^2$ are the upwardly-extending spindles F, which terminate at their upper ends in the boxes or frames F'. The lower portions of the frames F' form bearings for the shaft H, which projects through said frames and is provided at each end with a friction-roller J, which is fixed thereto, and the upper portions of the frames F′ are provided with recesses F², in which the blocks F³ fit closely and are vertically movable. Fixed to the outer sides of the blocks F³, so as to project through the sides of the frame F′, are the shafts F⁴, which carry the friction-rollers J′. The rollers J and J′ are similar in size and shape, and will thus be held one above the other, and in order that they may be pressed firmly together a stiff spring K is attached at one end to the under side of the frame F′ and at the other end to the top of the block F³, and the pressure of the spring will depress the block in the recess F² and force the roller J′ down upon the roller J. This construction is very clearly shown in Figs. 5 and 6.

Fixed firmly to the inner sides of the rear wheels of the vehicle, so as to encircle the axle C′, are the inwardly-projecting annular flanges L which are preferably made of thin metal, but may be made of any suitable material, and which are interposed between the rollers J and J′, so that the rollers will press firmly upon opposite sides of the flanges. The flange has a flat vertical portion L′, which rests against the spokes M of the wheels and which terminates in an annular rib L². The flange is firmly attached to the spokes M of the wheels by the clamps $g$, which are bolted to the spoke M by the bolts $g'$ and which are provided with inwardly-projecting hooks $g^2$, which fit nicely upon the rib L² of the flange.

The shaft H extends across the vehicle, as described, and fixed to the shaft near the center is the friction-disk N, having a conical face N′. The shaft H is supported and steadied near the center of the frame O, which has a depending spindle O′, which is supported in the clamp $h$, said clamp being firmly attached to the shaft E near the center thereof. The frame O has two parallel rearwardly-extending members O², which project upon each side of the friction-disk N, and in which the shaft H turns, and a forwardly-extending portion O³, having a recess O⁴ on the upper side, in which the boxes $j'$ are laterally movable.

Loosely mounted in the boxes $j'$ and projecting through the openings O⁵ in the frame O are the parallel shafts $j$, which are provided with suitable collars $j^2$ to hold them in position, and which are provided at their rear ends with conical friction-rollers $k$, which fit closely upon the conical face N′ of the friction-disk N. The rollers are held firmly against the disk by the spring $j^3$, which encircles the lower portion of the part O³ of the frame O, and the ends of which press against the outer sides of the boxes $j'$, thus forcing the boxes $j'$, shafts $j$, and rollers $k$ inwardly and causing the rollers to impinge firmly upon the disks N.

Fixed to the forward ends of the shafts $j$ are the spiral shafts P, which extend forwardly and are attached to the trunnions $m'$ of the friction-rollers $m$, which are supported by the box $n$, said box being suspended from the wagon-body A by the bracket $n'$, which should be vertically adjustable.

The shafts P are composed of two or more strands of wire wound spirally, so as to form a continuous shaft, which will be light and strong and which will be flexible, so that the motion of the vehicle cannot cramp the shaft.

The shafts P are stiffened by the collars P′, which are united by a link P², as shown, and in which turn the shafts P³, the strands of the shafts P being fixed to each end of the shafts P³. I have shown only one of these strengthening attachments; but if the vehicle is heavy and the shafts P long several may be applied. The trunnions $m'$ of the friction-rollers are mounted loosely in the box $n$, which should have suitable means for holding the rollers together, and one of the trunnions projects through the box and is provided with a pulley Q, which may be connected by a suitable belt with a motor, which may be mounted on the body A of the vehicle, and which will furnish power to propel the vehicle.

The following mechanism is employed to steer the vehicle: A hollow case R is mounted on the body A near the forward part thereof, so as to project above and below the same, and mounted in a slot R² of the upwardly-extending portion R′ of the case is a horizontal shaft $p$, having one end provided with a suitable crank $p'$ and the other with a friction-disk $p^2$. A vertical shaft $r$ (indicated by dotted lines) is mounted in the case R, said shaft projecting through the upper and lower ends of the case R, and having its upper end provided with a friction-roller $r'$, which bears against the friction-disk $p^2$, and having its lower end provided with the gear-wheel $r^2$, which meshes with the gear-wheel or pinion S′ of the horizontal shaft S. The shaft S is constructed of spiral wire like the shafts P, described above. One end of the shaft is supported by the angular bracket R³, which is attached to the lower end of the case R, and the forward end of the shaft is supported by the bracket $t$, which is adjustably attached to the frame D by the clamp $t'$. The rear end of the shaft is fixed to the horizontal shank of the pinion S′, and the forward end of the shaft is fixed to the horizontal shank of the gear-wheel S², said shank turning in the bracket $t$. The gear-wheel S² meshes with the gear-wheel $u'$, which is fixed to the upper end of the vertical shaft $u$, which turns in the frame T and has a friction-roller $u^2$ fixed to the lower end thereof. The frame T extends across the members D′ of the frame D, and is clamped to said frame near the forward end thereof. A similar frame T′ is clamped to the frame D just in front of the frame T, and suspended from said frame, so as to align with the roller $u^2$, is a similar roller $v$, which has an annular flange $v'$ fixed to its lower end, so as to extend beyond the face of the roller and overlap the lower end of the roller $u^2$, and prevent the belt W from dropping from between the rollers $u^2$ and $v$. The belt W passes between the rollers $u^2$ and $v$, which are pressed firmly upon it, and the ends of the belt are attached to the clips W', which are fixed to the axle C near the ends thereof.

The vehicle is propelled and operated as follows: Power is transmitted from a motor on the body A to the pulley Q, and this will turn the shafts P, the motion being transmitted from one of said shafts to the other by the friction-rollers $m$, which press firmly together. As the shafts P revolve, they turn the friction-rollers $k$, and as these bear against the friction-disk N, they will turn the disk and the shaft H, to which it is fixed. As the shaft H revolves, it turns the friction-rollers J, and as the flanges L are held between the rollers J and J', the flange is turned and turns the vehicle-wheels to which it is attached, thus propelling the vehicle. To steer the vehicle the disk $p^2$ is turned by means of the shaft $p$ and crank $p'$, and this, by means of the friction-roller $r'$, will turn the vertical shaft $r$, gear-wheel $r^2$, pinion $s'$, and shaft S, thus turning the gear-wheels $S^2$ and $u'$ and rotating the friction-roller $u^2$. As the belt W is pressed between the rollers $u^2$ and $v$ when the roller $u^2$ is turned, the belt W will be drawn between the rollers, and will turn the axle C to the right or left, as the case may be, and steer the vehicle, as the rear wheels will follow the forward wheels.

In constructing the above-described mechanism it is evident that any suitable material may be used; but in order that it may be light and easy running, it is better that the main supports be made of tubular steel. I also prefer to make the friction-rollers, wherever used in the mechanism, of india-rubber, as that is light and possesses great frictional qualities; but it is evident that the rollers may be made of other material—such, for instance, as wood, leather, or metal.

I do not wish to be confined to the precise arrangement of parts described above and shown in the drawings, as they may be modified without departing from the principle of my invention.

Having thus described my invention, what I claim as new, and desire to secure by Letters Patent, is—

1. A vehicle-propelling mechanism comprising annular flanges fixed to the vehicle-wheels, frictional rollers bearing against the outer and inner surfaces of the flanges, suitable supports for said rollers, and means for imparting motion to the same, substantially as described.

2. A vehicle-propelling mechanism consisting, essentially, of annular flanges fixed to the vehicle-wheels, frictional rollers to clasp said flanges, a shaft extending across the vehicle and connected with said rollers, suitable supports for said shaft, and means for rotating the shaft, substantially as and for the purpose specified.

3. A vehicle-propelling mechanism consisting, essentially, of annular flanges fixed to the vehicle-wheels, frictional rollers clasping said flanges and having suitable springs to force them against the same, a transverse shaft connecting the rollers of one side with those of the other, a frictional disk fixed to said shaft, and two parallel shafts having one end provided with frictional rollers to clasp the disk and the other end provided with a suitable driving-pulley, substantially as described.

4. A vehicle-propelling mechanism consisting, essentially, of annular flanges fixed to the vehicle-wheels, frictional rollers clasping said flanges, a transverse shaft connecting the rollers on one side with those on the other, a frictional disk fixed to said shaft, and two parallel flexible shafts suitably supported, said shafts having one end provided with frictional rollers to clasp the disk, and having their other ends connected by frictional rollers and provided with a driving-pulley, substantially as described.

5. The combination, with a vehicle having a body mounted on its front and rear axles, of propelling mechanism having means for turning the rear wheels, and a horizontally-separable frame below the body of the vehicle for connecting the front and rear axles, said frame consisting of two parallel members spread at their rear ends and clamped to the rear axles and united near their forward ends by a plate and attached to the forward axle by a king-bolt projecting through the plate, substantially as described.

6. A vehicle-propelling mechanism consisting, essentially, of the annular flanges L, fixed to the vehicle-wheels, as shown, the frame D, connecting the forward and rear axles, the shaft E, suspended from said frame, the frames F', supported on the shaft E and carrying the rollers J and J', the shaft H, connecting the rollers J, and having the disk N fixed thereto, the frame O, attached to the shaft E, and shaped and adapted to support the shaft H and shafts P, the rollers $k$, to clasp the disk N, the parallel flexible shafts P, attached to said rollers, means, as rollers $m$ and box $n$, for connecting said shafts, means, as bracket $n'$, for supporting the shafts, and a pulley Q for driving the shafts, all substantially as described.

7. The combination, with the spokes M of the vehicle-wheels, of the flanges L, having flat portion L' and rib $L^2$, the clamps $g$, having bolts $g'$ and hooks $g^2$ for attaching said flanges, substantially as described.

8. The combination, with the flanges L, fixed to the vehicle-wheels, as shown, of the rollers J J', having means, as shown, for rotating the same, the frame and block $F^3$ for supporting said rollers, said frame being suitably supported, as shown, and the spring K for holding the rollers together, substantially as described.

9. The combination, with the shafts P, of the collars P', link P², and shaft P³ for strengthening said shaft, substantially as set forth.

10. In a vehicle-propelling mechanism having means for turning the rear wheels, the combination, with said vehicle, of a frame extending across the forward axle, a pair of rollers suspended from said frame, a belt attached to the forward axle near the ends and extending between said rollers, and means for rotating said rollers so as to move the belt and steer the vehicle, substantially as described.

11. The combination, with the axle C and frame D, of the rollers $u^2$ and $v$, suspended from said frame, the belt W, attached to the end portions of the axle and extending between the rollers, and means, as shaft $u$, gear-wheel $u'$, flexible shaft S, with gear-wheel $S^2$ and pinion $S'$, vertical shaft $r$, having gear-wheel $r^2$ and roller $r'$, shaft $p$, disk $p^2$, and crank $p'$ for actuating said rollers, substantially as described.

12. The combination, with the roller $u^2$ and belt W, of the roller $v$, having flange $v'$ to hold the belt in position, substantially as described.

MARK A. LIBBEY.

Witnesses:
WILLIAM H. MORTON,
WILLIAM E. LORD.